United States Patent
Schmelzer

(10) Patent No.: US 10,794,070 B2
(45) Date of Patent: Oct. 6, 2020

(54) FORMWORK ANCHOR RECEPTACLE

(71) Applicant: DOKA GMBH, Amstetten (AT)

(72) Inventor: Myriam Schmelzer, Amstetten (AT)

(73) Assignee: DOKA GMBH, Amstetten (AT)

( * ) Notice: Subject to any disclaimer, the term of this patent is extended or adjusted under 35 U.S.C. 154(b) by 32 days.

(21) Appl. No.: 16/063,038

(22) PCT Filed: Dec. 16, 2016

(86) PCT No.: PCT/EP2016/081324
§ 371 (c)(1),
(2) Date: Jun. 15, 2018

(87) PCT Pub. No.: WO2017/103033
PCT Pub. Date: Jun. 22, 2017

(65) Prior Publication Data
US 2018/0363308 A1    Dec. 20, 2018

(30) Foreign Application Priority Data

Dec. 18, 2015 (EP) .................................. 15201058

(51) Int. Cl.
*E04G 17/04* (2006.01)
*E04G 17/065* (2006.01)

(52) U.S. Cl.
CPC ....... *E04G 17/0652* (2013.01); *E04G 17/042* (2013.01); *E04G 17/047* (2013.01);
(Continued)

(58) Field of Classification Search
CPC . E04G 17/0652; E04G 17/0657; E04G 17/06; E04G 17/065; E04G 17/0651; E04G 17/042; E04G 17/047; F16B 21/02
(Continued)

(56) References Cited

U.S. PATENT DOCUMENTS 2,116,597 A * 5/1938 Colt ..................... E04G 17/0658
249/217
2,659,125 A * 11/1953 Williams ............ E04G 17/0658
249/42
(Continued)

FOREIGN PATENT DOCUMENTS

CN           203441929 U     2/2014
DE             9412556 U1    10/1994
(Continued)

OTHER PUBLICATIONS

International Bureau of WIPO, International Preliminary Report on Patentability Issued in Application No. PCT/EP2016/081324, Jun. 19, 2018, WIPO, 6 pages.
(Continued)

*Primary Examiner* — Michael Safavi
(74) *Attorney, Agent, or Firm* — McCoy Russell LLP

(57) ABSTRACT

The present disclosure relates to a formwork anchor receptacle for arrangement on a bearing element of a formwork element, having a receptacle element, which has a receptacle opening for insertion of an anchor rod and a ball section for mounting on the mounting element of the formwork element, and having a retaining apparatus for retaining the receptacle element on the bearing element of the formwork element, wherein the retaining apparatus has a spacer element for contacting the bearing element of the formwork element, wherein the spacer element has an mounting opening for mounting on the receptacle element and a formwork device having such a formwork anchor receptacle.

12 Claims, 13 Drawing Sheets

(52) U.S. Cl.
CPC ....... *E04G 17/065* (2013.01); *E04G 17/0651* (2013.01); *E04G 17/0657* (2013.01)

(58) Field of Classification Search
USPC .............................................. 249/40, 42, 43
See application file for complete search history.

(56) References Cited

U.S. PATENT DOCUMENTS

| | | | | |
|---|---|---|---|---|
| 8,220,772 | B2* | 7/2012 | Schwoerer | .......... E04G 17/0657 249/216 |
| 9,222,271 | B2 | 12/2015 | Amon | |
| 9,580,922 | B2* | 2/2017 | Hagemes | ............ E04G 17/0652 |
| 2004/0079860 | A1* | 4/2004 | Ward | .................... E04G 17/045 249/33 |
| 2008/0173788 | A1* | 7/2008 | Brewka | ................... E04G 11/10 249/189 |
| 2008/0307736 | A1 | 12/2008 | Trimmer | |
| 2012/0304570 | A1* | 12/2012 | Braun | ..................... E04G 17/06 52/426 |
| 2014/0374568 | A1* | 12/2014 | Amon | ................. E04G 17/0652 249/1 |
| 2015/0167329 | A1* | 6/2015 | Hagemes | ............ E04G 17/0652 52/745.21 |
| 2017/0002575 | A1* | 1/2017 | Dingler | ................... E04G 17/14 |

FOREIGN PATENT DOCUMENTS

| | | | | |
|---|---|---|---|---|
| DE | 9415690 | U1 | 11/1994 | |
| DE | 102014012037 | * | 2/2016 | ......... E04G 17/0652 |
| EP | 1854941 | A2 | 11/2007 | |
| EP | 2816175 | A1 | 12/2014 | |
| FR | 2011358 | A1 | 2/1970 | |

OTHER PUBLICATIONS

ISA European Patent Office, International Search Report and Written Opinion Issued in Application No. PCT/EP2016/081324, Feb. 2, 2017, WIPO, 6 pages.

\* cited by examiner

FORMWORK ANCHOR RECEPTACLE

CROSS-REFERENCE TO RELATED APPLICATIONS

The present application is a U.S. National Phase of International Patent Application Serial No. PCT/EP2016/081324 entitled "FORMWORK ANCHOR RECEPTACLE," filed on Dec. 16, 2016. International Patent Application Serial No. PCT/EP2016/081324 claims priority to European Patent Application No. 15201058.3, filed on Dec. 18, 2015. The entire contents of each of the above-cited applications are hereby incorporated by reference in their entirety for all purposes.

TECHNICAL FIELD

The invention relates to a formwork anchor receptacle for arrangement on a bearing element of a formwork element, having a receptacle element, which has a receptacle opening for insertion of an anchor rod and a ball section for mounting on the bearing element of the formwork element, and having a retaining apparatus for retaining the receptacle element on the bearing element of the formwork element.

BACKGROUND

Furthermore, the invention relates to a formwork device with such a formwork anchor receptacle.

A formwork anchor receptacle of this kind is already known from EP 2 816 175.

During the construction of a building, formwork elements are erected at a certain distance from one another and are connected to one another by formwork anchors before filling of the gap thus formed with a filler material. The formwork anchors are removed after the concrete has set, so that in the following step the formwork elements can be released from the wall thus formed. By using a formwork anchor receptacle with a ball section, which is arranged in a support or bearing component of a formwork element, a pivotability of the formwork anchor out of the normal alignment with respect to the formwork element by for example 4° can be achieved. An offset between the anchor passage openings with respect to the formwork receptacles can advantageously be compensated for, in that a certain deviation from the normal with respect to a formwork element is ensured. Despite this offset, the formwork anchor receptacle or formwork anchor according to the invention ensures a supporting anchoring of the formwork elements and tightness with respect to the filling region formed between the formwork elements. Furthermore, this design ensures that a formwork anchor can be handled from one side. The erection and connection of formwork elements is thus simplified, and labour costs can consequently be reduced.

A drawback with the prior art is the comparatively complicated mounting of the formwork anchor receptacle on the formwork element. For this purpose, EP 2 816 175, in a preferred embodiment, provides a folding spring, which in the folded-in state is splayed against the inner wall of the support component of the formwork element. The formwork anchor receptacle is secured on the formwork element by the arrangement of the folding spring, wherein however the tiltability of the formwork anchor receptacle is maintained. The fitting of the folding spring is accompanied by the drawback that the retention of the formwork anchor receptacle is brought about solely by the frictional connection between the folding spring and the supporting or bearing element. Accordingly, there is a certain risk of the formwork anchor receptacle unintentionally becoming detached from the support component, especially during assembly and dismantling of the formwork arrangement. Furthermore, the folding spring may be lost during transport. Moreover, with this embodiment it proves to be comparatively difficult to limit the tilting of the formwork anchor receptacle with respect to the formwork element to a desired angular range. The angular setting is thus comparatively imprecise.

The problem of the invention, therefore, consists in mitigating or eliminating at least some of the drawbacks of the prior art. The invention thus sets itself the particular task of further developing a formwork anchor receptacle of the type mentioned at the outset, in such a way that the retention of the formwork anchor receptacle in the mounted state on the formwork device is facilitated.

The retaining apparatus of the disclosure comprises a spacer element for resting against the bearing element of the formwork element, wherein the spacer element comprises a mounting opening for mounting on the receptacle element.

By means of the ball section, the formwork anchor receptacle in the intended operating state can be tilted by a tilting angle different from 0°, by for example at least 3°, in particular essentially 4°, out of an orthogonal position relative to the formwork element into an inclined position. The fitting of a formwork anchor, which is introduced from a formwork element lying opposite into the receptacle opening of the formwork anchor receptacle, can thus be facilitated. For the tiltable mounting of the formwork anchor receptacle, the bearing element can comprise a ball socket, i.e. a section curved in a spherical concave manner, on which the ball section of the formwork anchor receptacle is mounted. Moreover, the formwork anchor receptacle according to the invention comprises a spacer element, with which, in the intended operating position of the formwork anchor receptacle on the bearing element of the formwork device, a tilting of the receptacle element with respect to the formwork element can be limited in at least one tilting direction. Accordingly, the spacer element prevents the formwork anchor receptacle from being tilted beyond the desired maximum tilting angle, in that the spacer element makes contact with the bearing element of the formwork device when the maximum tilting angle is reached. Advantageously, the spacer element thus brings about a certain centering of the formwork anchor receptacle with respect to the bearing element of the formwork device. Viewed in the axial direction of the receptacle opening for the formwork anchor, the ball section is preferably arranged on one end region and the spacer element on the other end region of the formwork anchor receptacle. The spacer element preferably has a greater extension perpendicular to the axis of the receptacle opening (i.e. perpendicular to the longitudinal axis of the receptacle element) than the fastening section of the receptacle element, to which the spacer element is fixed. A contact surface is formed on the outer circumference of the spacer element, which contact surface comes into contact with a corresponding contact surface of the bearing element in the presence of a specific tilting angle of the formwork anchor receptacle with respect to the formwork element. As a contact surface, the bearing element preferably comprises a cylindrical or truncated cone-shaped inner surface. As a result of the mounting of the spacer element on the receptacle element, the spacer element, unlike the folding spring fixed to the bearing element in the prior art, accompanies the tilting of the formwork anchor receptacle. For the mounting of the spacer element on the receptacle element, the spacer element comprises a mounting opening preferably closed all round, in which the fastening section of the receptacle element is preferably accommodated with an essentially precise fit. Advantageously, therefore, the spacer element is fixed via the mounting opening to the receptacle element, as a result of which the assembly and dismantling of the formwork device is greatly facilitated overall.

In order to enable or facilitate the introduction of the formwork anchor into the formwork anchor receptacle, an anti-rotation securing member is provided between the receptacle element and the spacer element in a preferred embodiment, which anti-rotation securing member preferably comprises at least one elevation and a corresponding recess. Depending on the embodiment, the elevation can be provided on the receptacle element and the recess on the spacer element or vice versa. By means of the form-fit engagement of the elevation in the recess, a rotation of the spacer element relative to the receptacle element about its longitudinal axis is blocked. The receptacle opening of the receptacle element is preferably provided at least in sections with an internal thread, into which a corresponding external thread of an anchor rod engages. The screwing of the anchor rod into the formwork anchor receptacle can be facilitated by means of the anti-rotation securing member.

If the spacer element at the outer circumference comprises a first contact surface preferably curved in the shape of a circular arc for resting against the bearing element of the formwork element, a reliable support of the spacer element on the bearing element can take place. The bearing element preferably comprises a corresponding concave, in particular truncated cone-shaped or cylindrical contact surface, against which the first contact surface of the spacer element rests.

According to a particularly preferred embodiment, the first contact surface of the spacer element has a first radial distance from the central axis of the receptacle element and a second contact surface of the spacer element has a second radial distance from the central axis of the receptacle element, wherein the first radial distance of the first contact surface is greater than the second radial distance of the second contact surface. For the purposes of this disclosure, radial distance is understood to mean the maximum distance from the given contact surface to the central axis of the receptacle element, which radial distance coincides with the axis of the receptacle opening of the receptacle element. Accordingly, the second contact surface of the spacer element is arranged closer to the central axis of the receptacle element than the first contact surface of the spacer element. This means that the mounting opening of the receptacle element is arranged eccentrically with respect to the main extension plane of the receptacle element (i.e. the plane perpendicular to the axis of the receptacle opening). The receptacle element can optionally be rested against the first contact surface or against the second contact surface on the bearing element. If the first contact surface lies against the bearing element, the central axis of the receptacle element has a smaller maximum tilting angle with respect to the central axis of the bearing element than when the second contact surface of the receptacle element lies against the bearing element. As a result of the asymmetrical arrangement of the spacer element with respect to the central axis of the receptacle element, the fitting of the formwork anchor receptacle on the formwork element can be simplified.

In order to facilitate the handling of the formwork anchor receptacle, it is advantageous if the spacer element can be transferred between a first functional position, in particular for the mounting of the receptacle element on the bearing element, and a second functional position, in particular for limiting the tilting of the receptacle element in a first tilting direction, wherein the spacer element in the second functional position is arranged rotated through an angle differing from 0° or 360°, preferably essentially 180°, relative to the receptacle element. In this embodiment, the spacer element can be displaced between two different positions on the receptacle element. The first functional position is preferably constituted as an installation position, in order to enable or facilitate the mounting of the formwork anchor receptacle on the bearing element. The second functional position is preferably constituted as an operating position, in which the spacer element limits tilting of the formwork anchor receptacle with respect to the bearing element in a first tilting direction. For the purpose of transferring the spacer element between the first functional position and the second functional position, the spacer element is preferably rotated through essentially 180° about the central axis of the receptacle element.

According to a particularly preferred embodiment, the spacer element can be displaced from the first functional position in the longitudinal direction of the receptacle element into a first intermediate position, in which the anti-rotation securing member between the receptacle element and the spacer element is in a released state, wherein the spacer element can be rotated out of the first intermediate position into a second intermediate position, from which the spacer element can be displaced in the longitudinal direction of the receptacle element into the second functional position, in which the anti-rotation securing member is present in a secured state. In this embodiment, the spacer element is mounted on the receptacle element displaceable in the longitudinal direction of the receptacle element. The anti-rotation securing member is released by displacing the spacer element in the one direction along the receptacle element, so that the spacer element can be rotated through an angle of rotation different from 0° and 360°, preferably of essentially 180°. The spacer element can then be displaced in the opposite direction along the receptacle element, wherein the anti-rotation securing member is restored. If the anti-rotation securing member comprises an elevation on the receptacle element and a recess on the spacer element (or vice versa), the spacer element can be displaced along the receptacle element to an extent such that the engagement between the elevation and the recess is released or restored. In this embodiment, the spacer element in the first and second intermediate position is arranged in each case completely offset in the longitudinal direction of the receptacle element with respect to the elevation or recess on the receptacle element.

In order to hold the spacer element easily and reliably in the given functional position, it is advantageous if a spring element is provided for pretensioning the spacer element in the direction of the first or second functional position, wherein the spring element preferably comprises a helical spring between the spacer element and a preferably circular bearing surface of the receptacle element.

According to a further preferred embodiment, the spacer element comprises half-shells connected to one another detachably, wherein the spacer element in the connected state of the half-shells is arranged in a circumferential groove of the receptacle element. The two half-shells can thus be connected to one another detachably on the receptacle element, for example by means of a screw, rivet or bolt connection. The circumferential groove preferably has essentially the same height, i.e. extension in the longitudinal direction of the receptacle element, as the spacer element.

In order to be able to overcome the anti-rotation securing member between the spacer element and the receptacle element without a longitudinal displacement of the spacer element, it is advantageous if the spacer element is mounted on the receptacle element non-displaceably in the longitudinal direction of the receptacle element, wherein the anti-rotation securing member comprises at least one elastically deformable engagement element. In this embodiment, the anti-rotation securing member comprises at least one elastically deformable engagement element, in particular in the form of a latching tab, which can be caused to engage with a corresponding receptacle part, in particular with an indentation. For displacement of the spacer element, the form-fit connection between the engagement element and the receptacle part can be released or restored by elastic deformation.

In order to enable or facilitate the arrangement of the formwork anchor in the receptacle opening of the receptacle element, the retaining apparatus preferably comprises an anti-rotation securing element for the anti-rotation securing of the receptacle element with respect to the bearing element of the formwork element, wherein the anti-rotation securing element preferably comprises a projection on the receptacle element for engagement in a recess of the bearing element of the formwork element.

The most varied embodiments of the anti-rotation securing element can be provided, which are intended to be provided to limit or prevent a rotation of the receptacle element about its central axis. Preference is however given to an embodiment wherein the projection of the anti-rotation securing element is arranged immovably on the outer side of the receptacle element. For this purpose, the projection is preferably formed integral with an in particular cylindrical portion of the receptacle element. The projection of the anti-rotation securing element preferably extends over an angle of less than 180°, in particular less than 90°, at the outer side of the receptacle element. This embodiment is especially advantageous when the spacer element comprises an eccentric mounting opening. In this case, the spacer element can be displaced between an installation position, in which the first contact surface is arranged on the side of the projection, and an operating position, in which the first contact surface is arranged lying opposite the projection. In the installation position, the formwork anchor receptacle thus has a smaller maximum transverse or radial extension perpendicular to the central axis than in the operating position. In the installation position of the spacer element, the ball section of the receptacle element can be placed on the corresponding ball socket of the bearing element. In the operating position of the spacer element, the projection of the anti-rotation securing element is engaged with the recess of the bearing element, wherein the formwork anchor receptacle is secured against removal or undesired release from the bearing element by the interaction of the anti-rotation securing element and the spacer element. In particular, this embodiment has the advantage that the formwork anchor receptacle is mounted on the formwork element by a form-fit connection between the anti-rotation securing element and the bearing element, when the spacer element is arranged in the operating position. Compared to the friction-locked splaying of the folding spring in the prior art, it is thus possible to prevent in a particularly reliable manner the formwork anchor receptacle from being released from the bearing element undesirably, especially during the assembly and dismantling of the formwork device.

To achieve a simple, cost-effective embodiment, a spacer disc with outer sides arranged essentially parallel to one another can be provided. In this embodiment, the spacer disc has an essentially constant wall thickness along its main plane.

In an alternative embodiment, the spacer element comprises on the outer circumference a circumferential flange part projecting from a plate part, which flange part constitutes at the outer side the first and the second contact surface. This embodiment is characterized by low weight and saving on material. In this embodiment, the spacer element can also comprise, adjacent to the mounting opening, a further flange part projecting from the plate part, on which flange part at least one elastically deformable elevation is formed.

In order to facilitate the handling of the formwork anchor receptacle, it is advantageous if the spacer element is connected to a grip part for transferring the spacer element between the first functional position and the second functional position, wherein the grip part is preferably formed by at least one indentation of the spacer element.

In order to facilitate the assembly and dismantling of the formwork anchor receptacle and to mount the spacer element during operation on the receptacle element, it is advantageous if the spacer element is secured against removal from the receptacle element by means of a retaining element, in particular by means of a retaining ring, retaining spring or a screw connection.

BRIEF DESCRIPTION OF THE FIGURES

The invention is explained in greater detail below with the aid of preferred examples of embodiment, to which it is not however intended to be limited. In the drawing.

DETAILED DESCRIPTION

Figure 1:
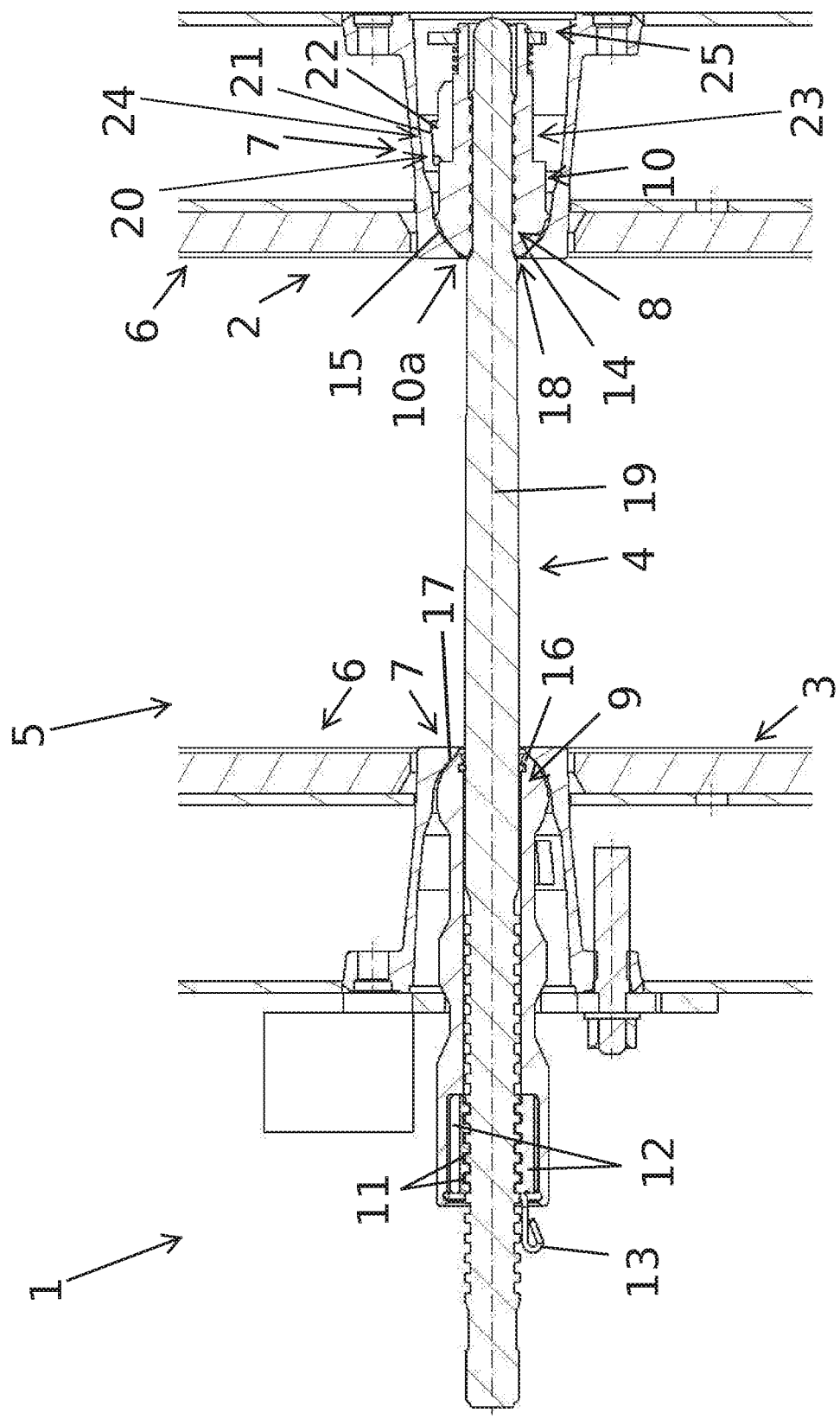
FIG. 1 shows a cross-sectional view of a formwork device according to the invention with two formwork elements arranged at a distance from one another, which are connected to one another by a formwork anchor, wherein the formwork anchor is mounted with the aid of, respectively, a formwork anchor receptacle on the closing side and on the positioning side of the formwork device.

FIG. 1 shows a detail of a formwork device 1, which can be used in the manufacture of a concrete component. The formwork device 1 comprises a formwork element 2 on the positioning side and a further formwork element 3 on the closing side of formwork device 1. Formwork element 2 and further formwork element 3 are connected to one another by means of at least one formwork anchor 4, in such a way that a free space 5 for filling with concrete is formed between formwork element 2 and further formwork element 3. Formwork element 2 and further formwork element 3 each comprise in the known manner a formwork panel 6, which limits the free space between formwork element 2 and further formwork element 3. Moreover, formwork element 2 comprises a bearing element 7, on which a formwork anchor receptacle 8 for receiving the one end of formwork anchor 4 is arranged detachably. Formwork element 3 comprises a corresponding bearing element 7, on which a further formwork anchor receptacle 9 for receiving the other end of formwork anchor 4 is mounted detachably. Formwork anchor receptacle 8 comprises a receptacle element 10 with a receptacle opening 10a, which is formed in sections with an internal thread, into which a corresponding external thread of the one end of formwork anchor 4 can engage.

As can also be seen from FIG. 1, anchor rod 4 comprises grooves 11 at the other end, with which a preliminary adjustment of the distance between formwork anchor receptacle 8 and further formwork anchor receptacle 9 is enabled. For this purpose, further formwork anchor receptacle 9 comprises an opening, into which two half-shell holding pieces 12 are introduced together with anchor rod 4. Half-shell holding pieces 12 comprise grooves at their inner side, which grooves engage in grooves 11 of anchor rod 4. After being introduced into the opening of further formwork anchor receptacle 9, half-shell holding pieces 12 are thus fixedly connected to anchor rod 4. In the introduced state, half-shell holding pieces 12 abut against a projection in the opening. Proceeding from this projection, a further opening with a smaller diameter than in the region of the opening is provided. Furthermore, an elastic connection member in the form of a fixing spring washer 13 is introduced into the opening at the end region the opening, so that half-shell holding pieces 12 are pressed against the projection and thus locked in place with further formwork anchor receptacle 9. Further formwork anchor receptacle 9 on the formwork closing side and formwork anchor 4 are constituted as in EP 2 816 175, so that more detailed comments are dispensed with in this regard.

As can also be seen from FIG. 1, formwork anchor receptacle 8 comprises at the end region facing further formwork anchor receptacle 9 a ball section 14 with an external surface curved in a spherical manner. Bearing element 7 comprises a ball socket section 15 with a bearing surface curved in a spherical concave manner, on which ball section 14 of formwork anchor receptacle 8 can roll. Further formwork anchor receptacle 9 comprises a further ball section 16, which can roll on a further ball socket section 17 of bearing element 7 on the closing side. Formwork anchor receptacle 8 and further formwork anchor receptacle 9 each comprise a through-opening 18 for the passage of formwork anchor 4. According to FIG. 1, anchor rod 4 is represented in a central position, in which a longitudinal axis 19 of anchor rod 4 is arranged aligned with the central axis of through-openings 18 of formwork anchor receptacles 8, 9. On account of ball section 14 on formwork anchor receptacle 8 and further ball section 16 on further formwork anchor receptacle 9, anchor rod 4 can be tilted out of the shown central position, so that longitudinal axis 19 of anchor rod 4 can be arranged at an angle deviating from 90° with respect to formwork panels 6 of formwork element 2 and further formwork element 3. Moreover, the tiltable arrangement of formwork anchor receptacle 8 offers the advantage that the introduction of anchor rod 4 is facilitated.

The assembly of formwork device 1 takes place such that formwork anchor receptacle 8 is first connected to bearing element 7 of positioning-side formwork element 2. Further formwork anchor receptacle 9 is then fitted on formwork anchor 4, wherein a longitudinal adjustment with respect to the distance between formwork element 2 and further formwork element 3 is carried out. Formwork anchor 4 with further formwork anchor receptacle 9 is then arranged on bearing element 7 of further formwork element 3, wherein the free end of formwork anchor 4 is connected to bearing element 7 of positioning-side formwork element 2. The positioning formwork and the closing formwork are thus connected to one another by formwork anchor 4.

As can also be seen from FIG. 1, a retaining apparatus 20 for retaining receptacle element 10 on bearing element 7 of formwork element 2 is also provided.

Retaining apparatus 20 comprises on the one hand an anti-rotation securing element 21 for securing receptacle element 10 against rotation with respect to bearing element 7 of formwork device 1. Anti-rotation securing element 21 is formed by a projection 22, which extends upwards from a cylindrical portion 23 of receptacle element 10. In the operating position, projection 22 is arranged partially in a recess 24 of bearing element 7 of formwork device 1, as a result of which the rotation of formwork anchor receptacle 8 relative to bearing element 7 is limited or blocked.

Bearing element 7 comprises, lying opposite recess 24, a further recess, in which projection 22 is arranged in an alternative operating position.

Retaining apparatus 20 also comprises a spacer element 25 which, depending on the tilting angle of formwork anchor receptacle 8, comes into contact with the inner side of bearing element 7 of formwork element 2. Spacer element 25 comprises a mounting opening 25a (see FIG. 6), via which spacer element 25 is retained detachably on receptacle element 10. Moreover, spacer element 25 comprises at the outer circumference a first contact surface 26 curved in the shape of a circle arc in cross-section and a second contact surface 27 lying opposite for resting on bearing element 7 of formwork element 2. In the embodiment of FIGS. 1 to 8, a spacer disc with outer sides arranged essentially parallel to one another is provided as a spacer element 25.

In the embodiment shown, first contact surface 26 of spacer element 25 has a first radial distance from central axis 28 of receptacle element 10, second contact surface 27 of spacer element 25 a second radial distance from central axis 28 of receptacle element 10 (see FIGS. 2 to 8). The first radial distance of first contact surface 26 is greater by a multiple than the second radial distance of second contact surface 26, so that mounting opening 25 is formed eccentrically on spacer element 25.

As can be seen from FIGS. 2 to 5, spacer element 25 can be transferred in a first tilting direction between a first functional position (see FIG. 2) for the assembly of receptacle element 10 on bearing element 8 and a second functional position (see FIG. 5) for limiting the tilting of receptacle element 10 with respect to central axis 28 of through-opening 18 of bearing element 7. Tilting into a second, opposite tilting direction is limited by projection 22. Spacer element 25 is arranged in the second functional position, i.e. the operating position, rotated through an angle of essentially 180° relative to receptacle element 10. First contact surface 26 of spacer element 25 in the installation position is thus arranged at the side of projection 22 of anti-rotation securing element 21, in the operating position at the side of receptacle element 10 facing away from projection 22 of anti-rotation securing element 21.

As can be seen from FIG. 2 to 8, an anti-rotation securing member 30 (see FIG. 6 to 8) is provided between receptacle element 10 and spacer element 25. In the embodiment shown, anti-rotation securing member 30 comprises two elevations 31 on a cylindrical portion 10b of receptacle element 10, wherein elevations 31, in the secured state of anti-rotation securing member 30, engage in two corresponding recesses or indentations 32 on spacer element 25. Recesses 32 proceed from the otherwise circular mounting opening 25a of spacer element 25.

Figure 2:
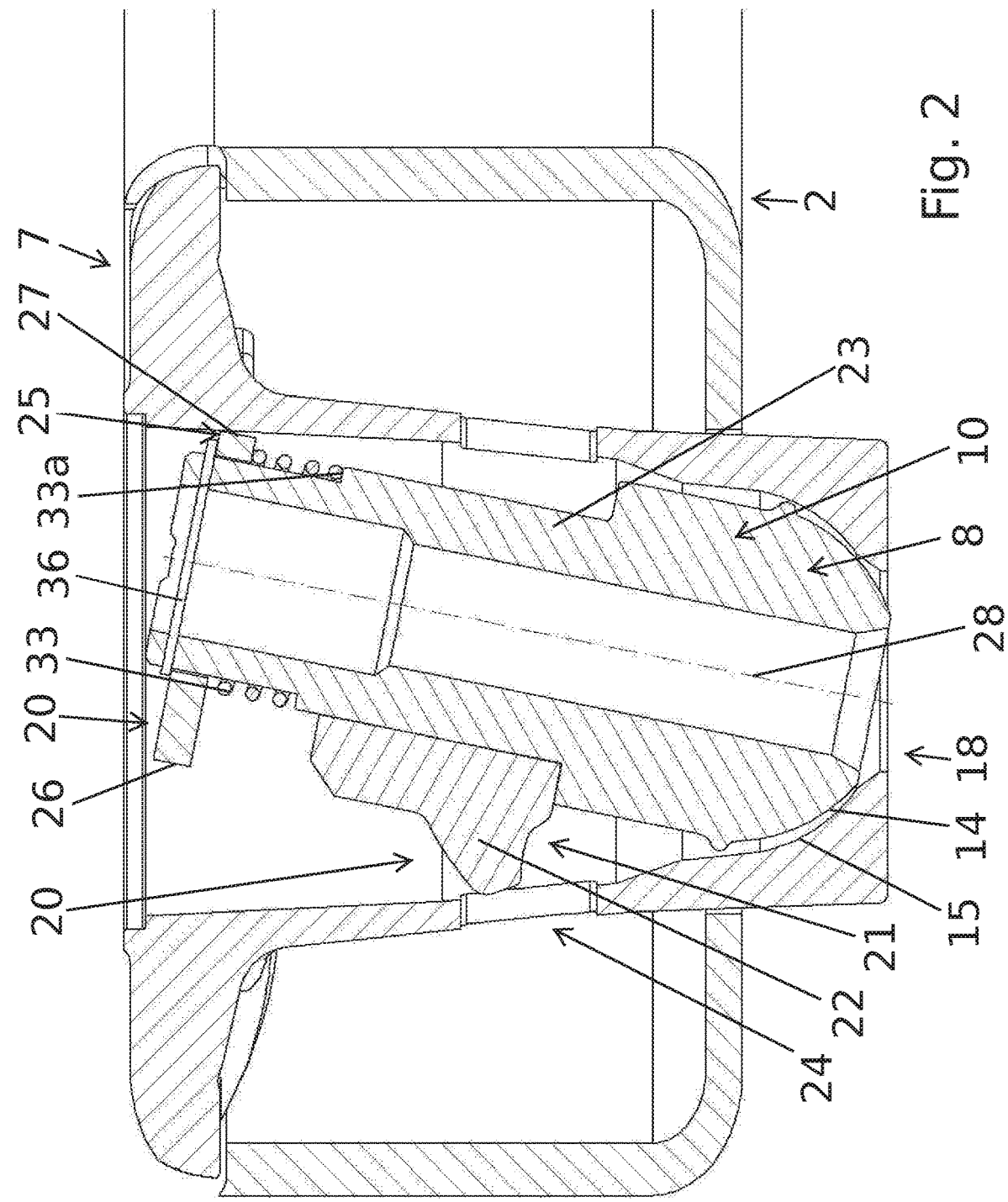
FIG. 2 shows a detail view of the formwork device according to FIG. 1 in the region of the formwork anchor receptacle on the positioning-side formwork element, wherein a spacer element of the formwork anchor receptacle is arranged in an installed position.
Figure 3:
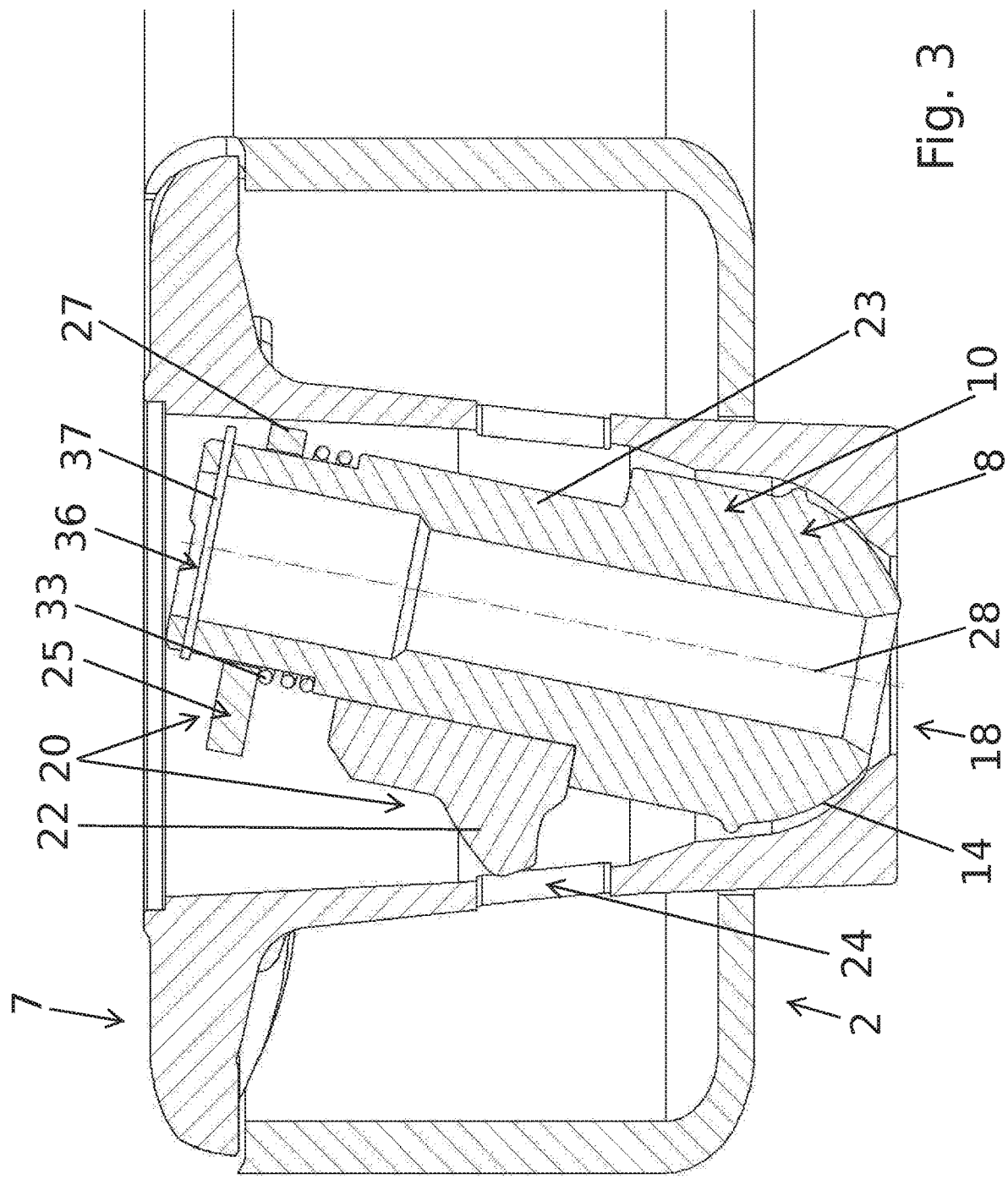
FIG. 3 shows a detail view according to FIG. 2, wherein the spacer element of the formwork anchor receptacle is arranged in a first intermediate position displaced in the longitudinal direction.
Figure 4:
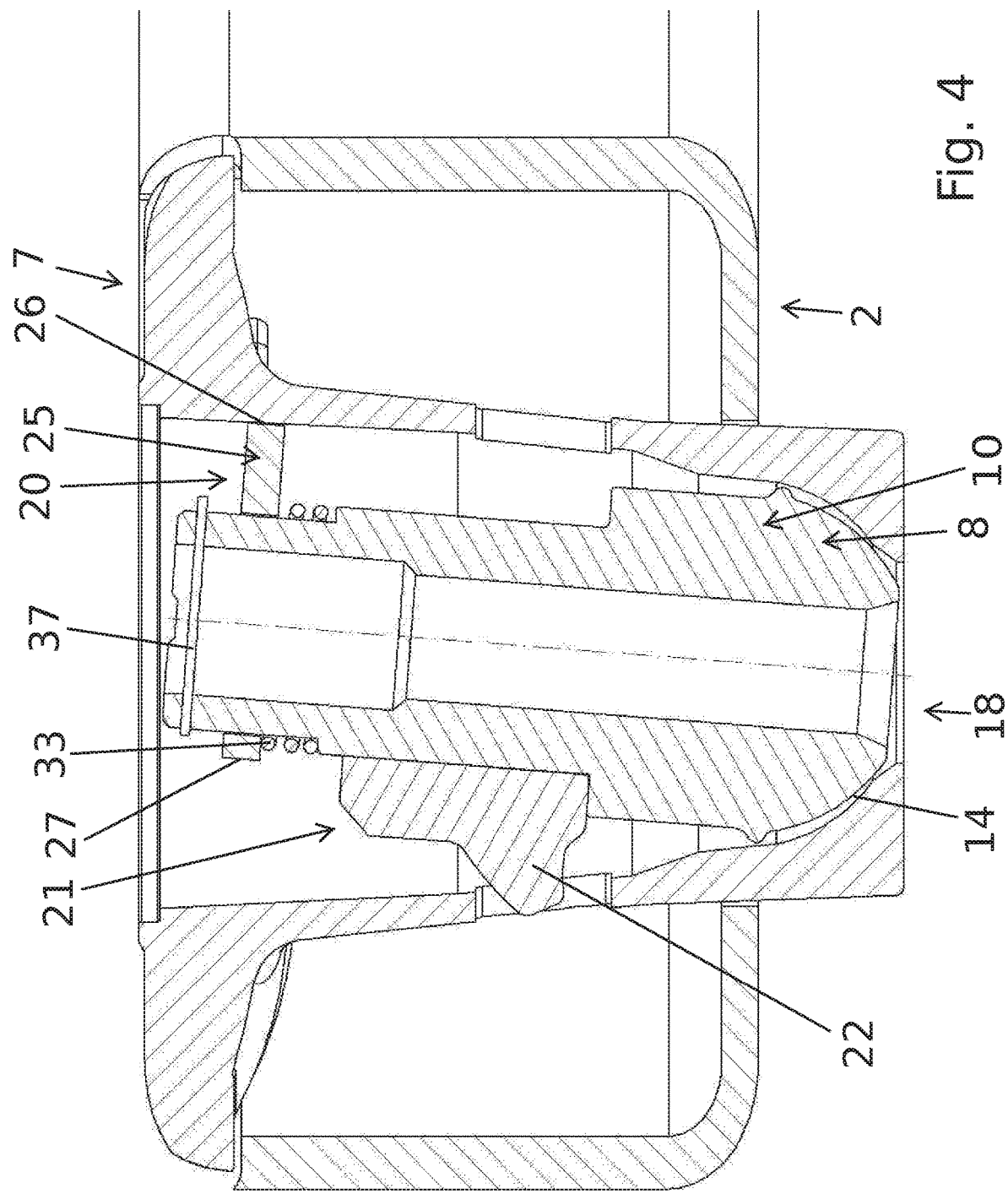
FIG. 4 shows a detail view according to FIGS. 2, 3, wherein the spacer element of the formwork anchor receptacle is arranged in a second intermediate position rotated through 180°.
Figure 5:
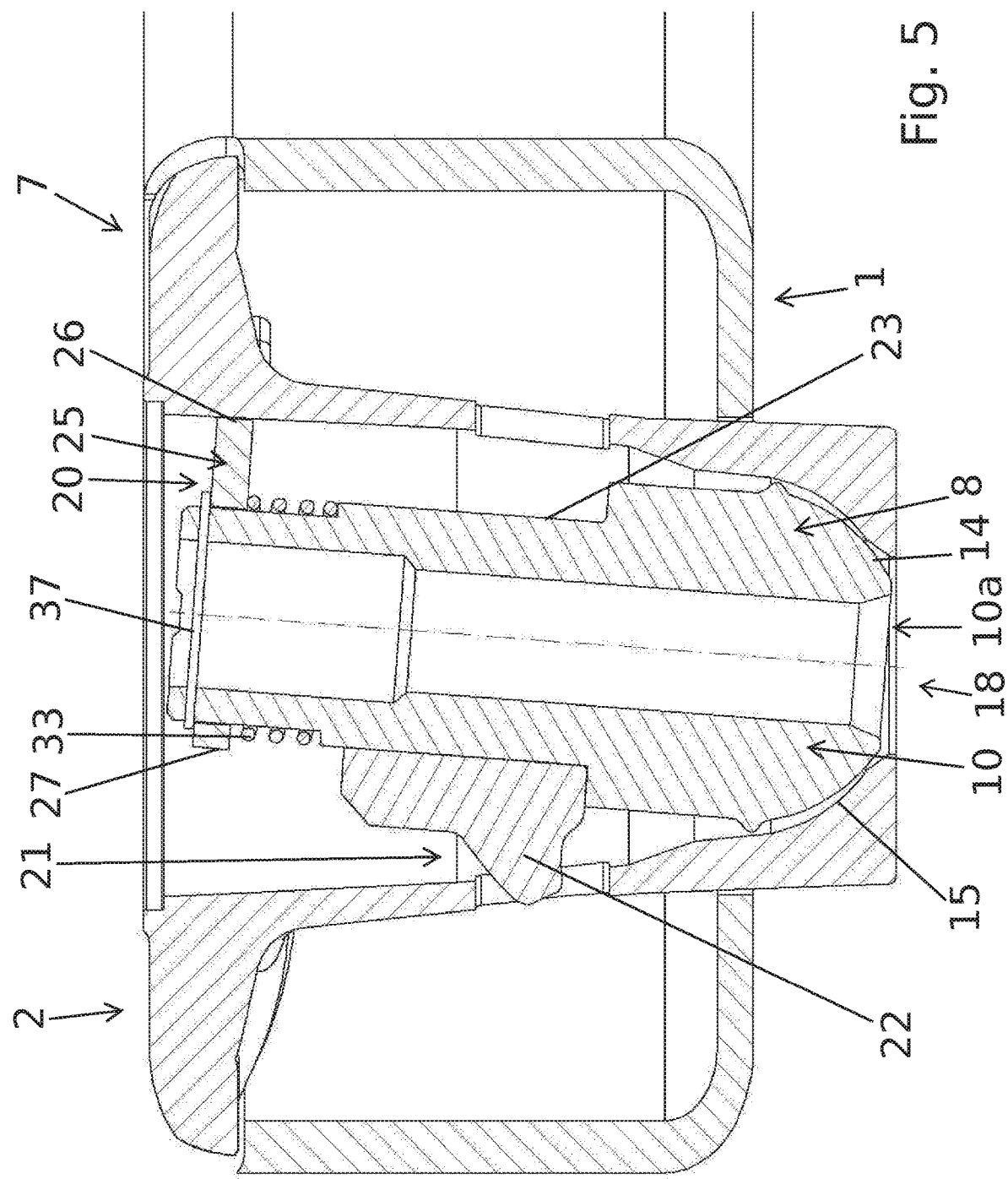
FIG. 5 shows a detail view according to FIG. 2 to 4, wherein the spacer element of the formwork anchor receptacle is arranged in an operating position pushed back in the longitudinal direction.

Proceeding from the first functional position (installation position) according to FIG. 2, spacer element 25 can be displaced against the effect of a spring element 33 in the direction of the longitudinal axis 28 of receptacle element 10 into a first intermediate position according to FIG. 3, in which recesses 32 on spacer element 25 are arranged beneath elevations 31 on receptacle element 10. Anti-rotation securing member 30 is thus arranged between receptacle element 10 and spacer element 25 in a released state, so that spacer element 25 can be rotated out of the first intermediate position through essentially 180° into a second intermediate position (see FIG. 4), from which spacer element 25 can be displaced with the aid of spring element 33 in the longitudinal direction of receptacle element 10 into the second functional position (operating position). In the operating position, anti-rotation securing member 30 is again present in a secured state, so that spacer element 25 is secured against a rotation relative to receptacle element 10. In the embodiment shown, spring element 33 for pretensioning spacer element 25 in the direction of the first or second functional position comprises a helical spring between an outer side of spacer element 25 and a circular-ring bearing surface 33a of receptacle element 10.

Figure 6:
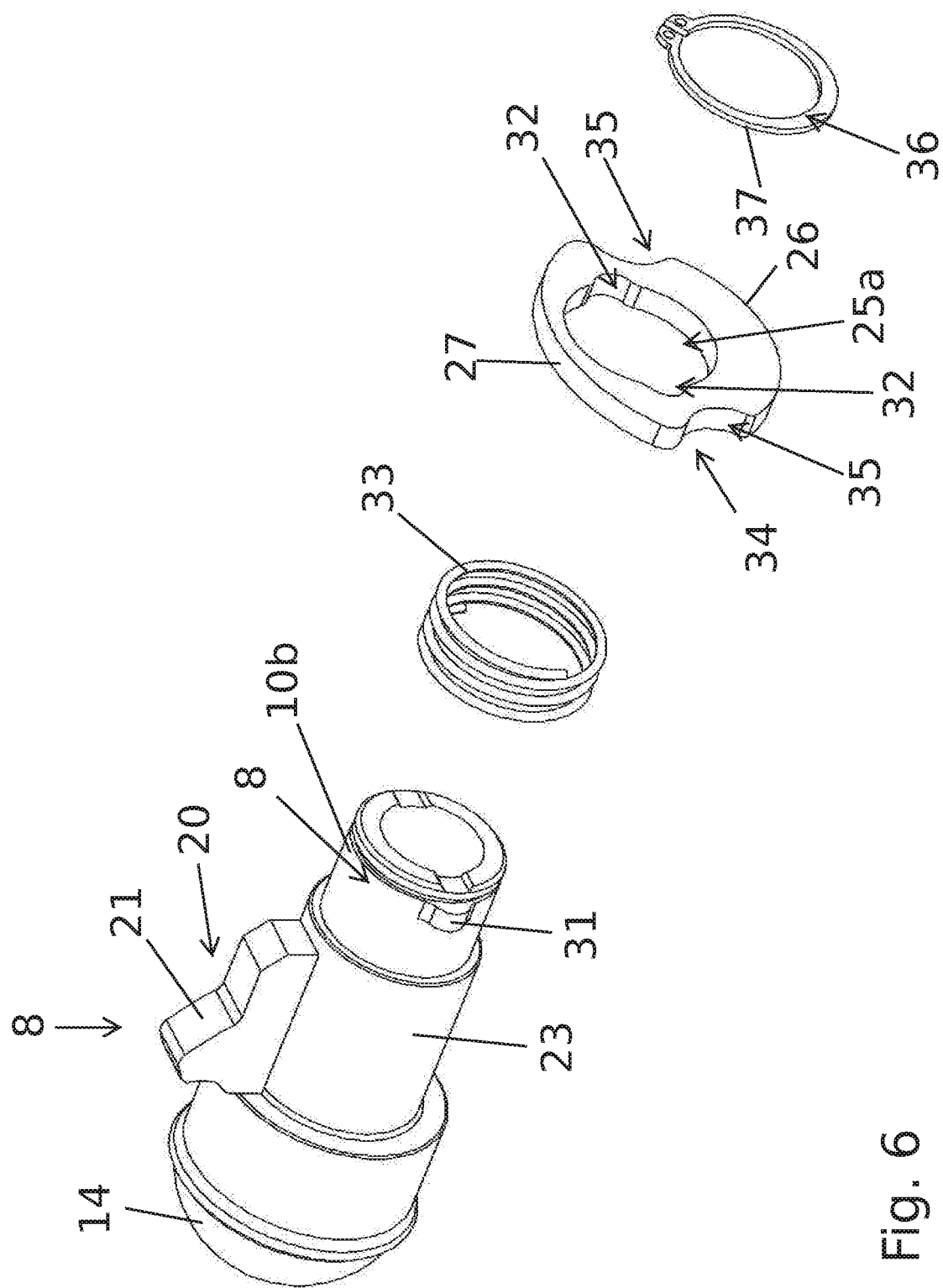
FIG. 6 shows an exploded representation of the formwork anchor receptacle of the formwork device according to FIG. 1 to 5.
Figure 7:
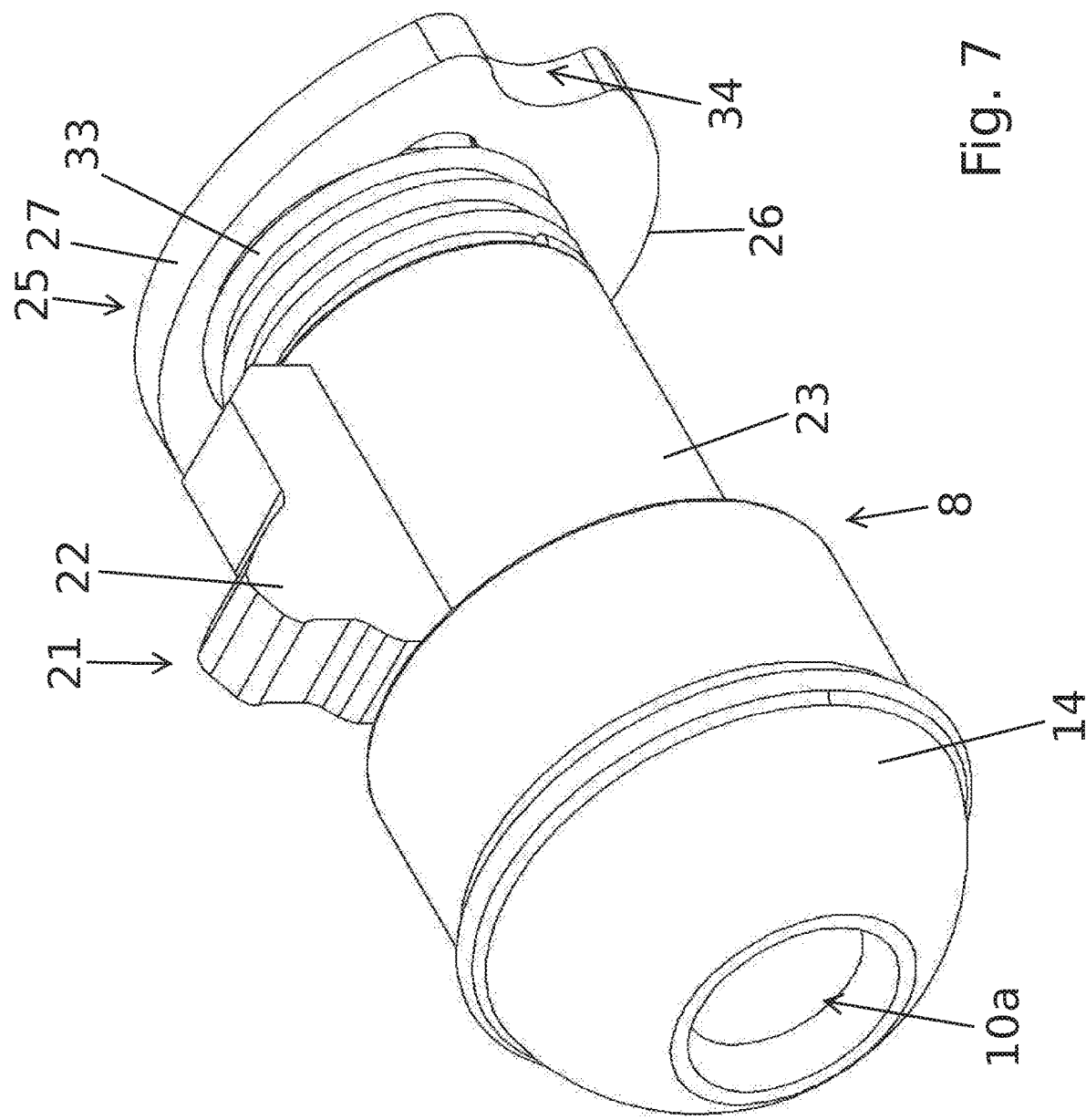
FIGS. 7, 8 show diagrammatic views of the formwork anchor receptacle of the formwork device according to FIG. 1 to 6.
Figure 8:
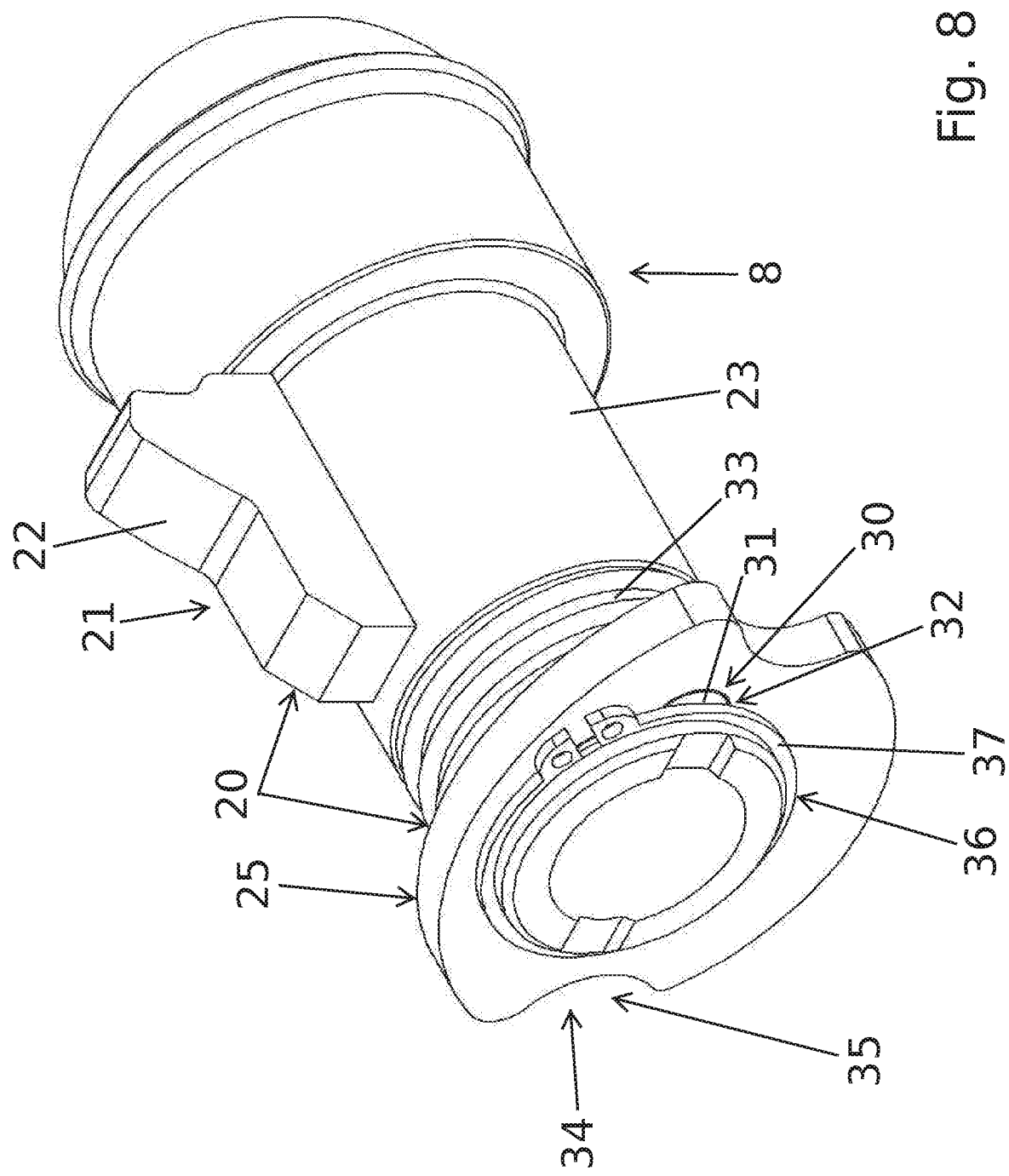
Figure 9:
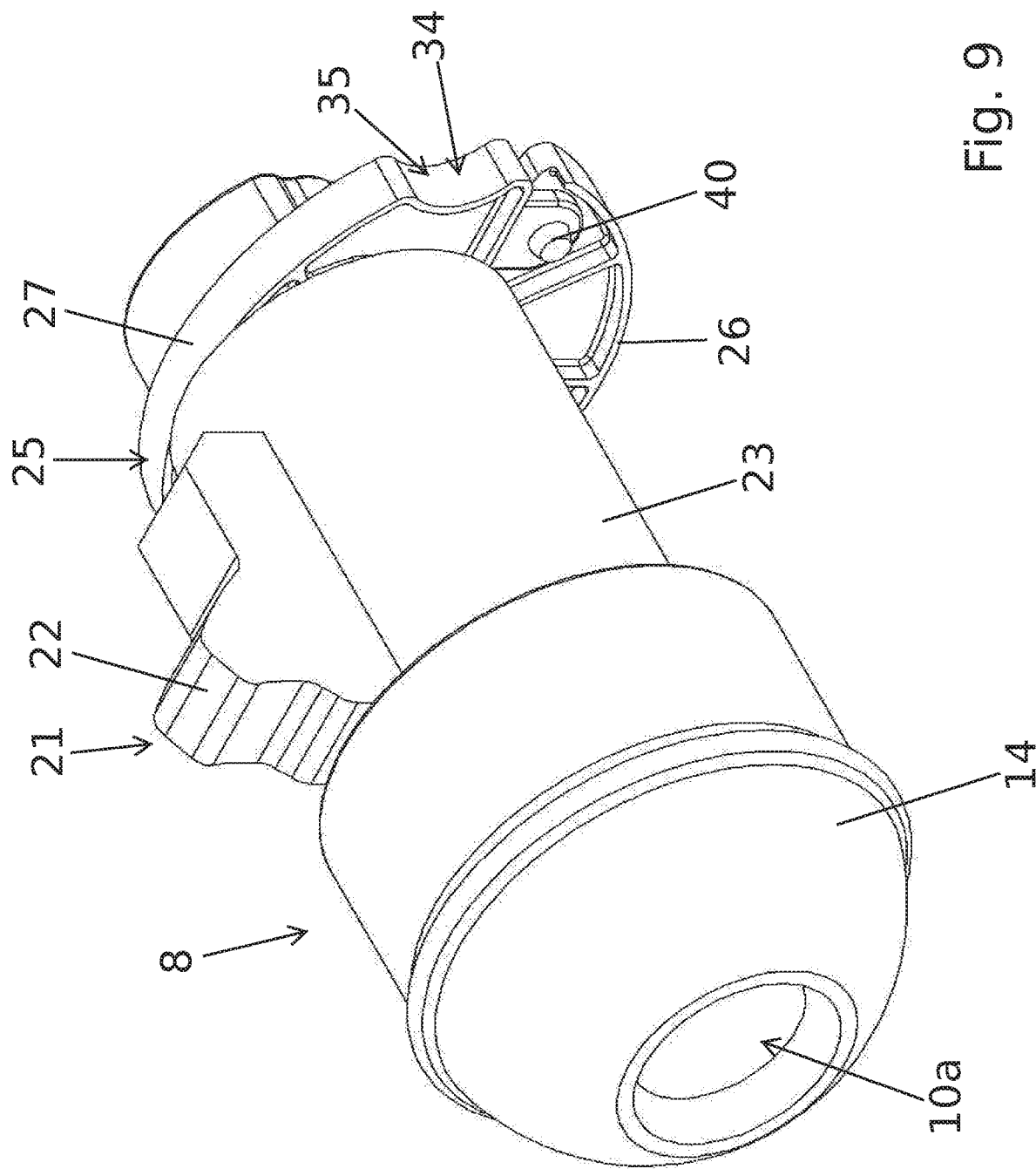
FIGS. 9, 10 show diagrammatic views of a further embodiment of the formwork anchor receptacle according to the invention.
Figure 10:
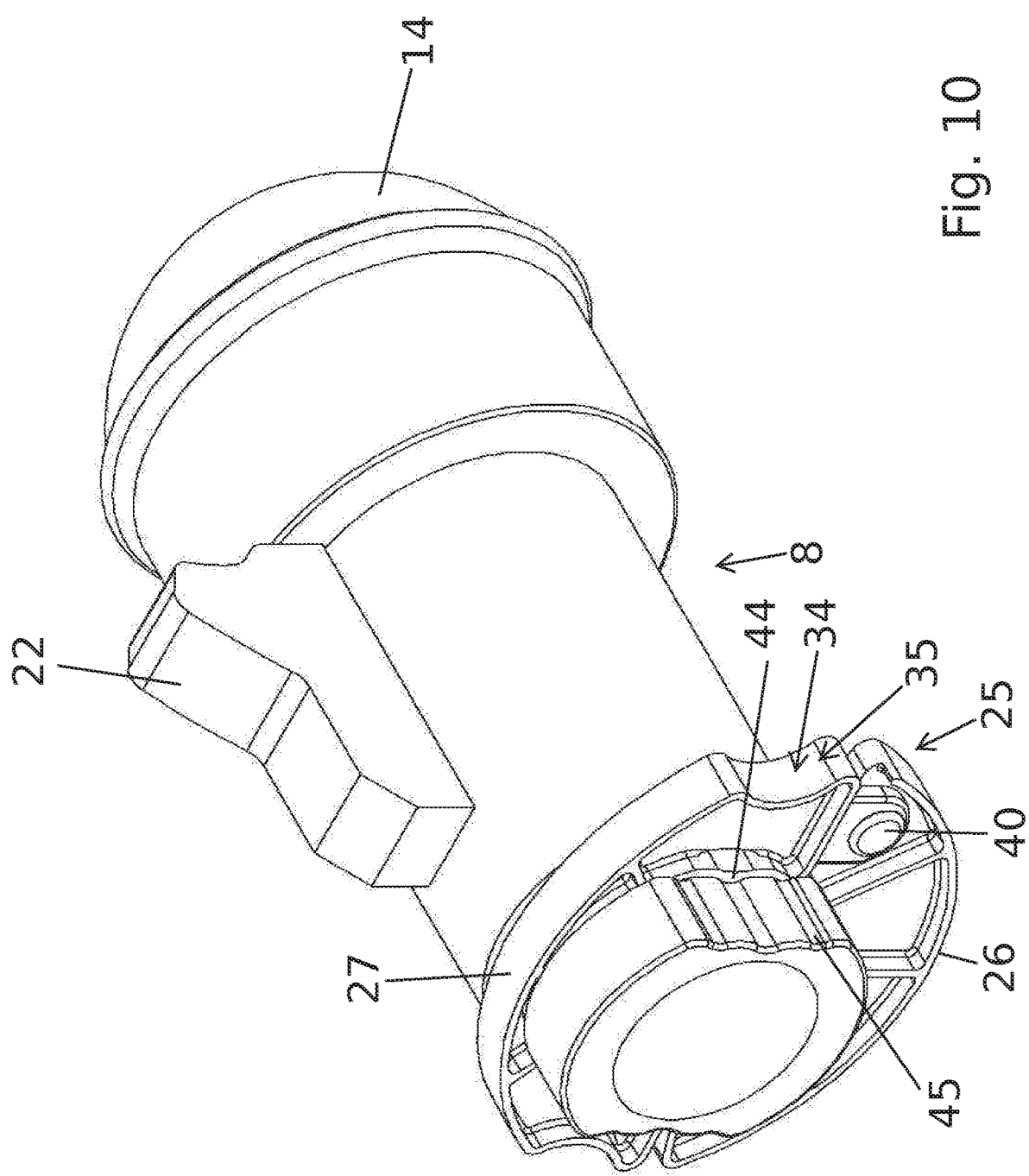
Figure 11:
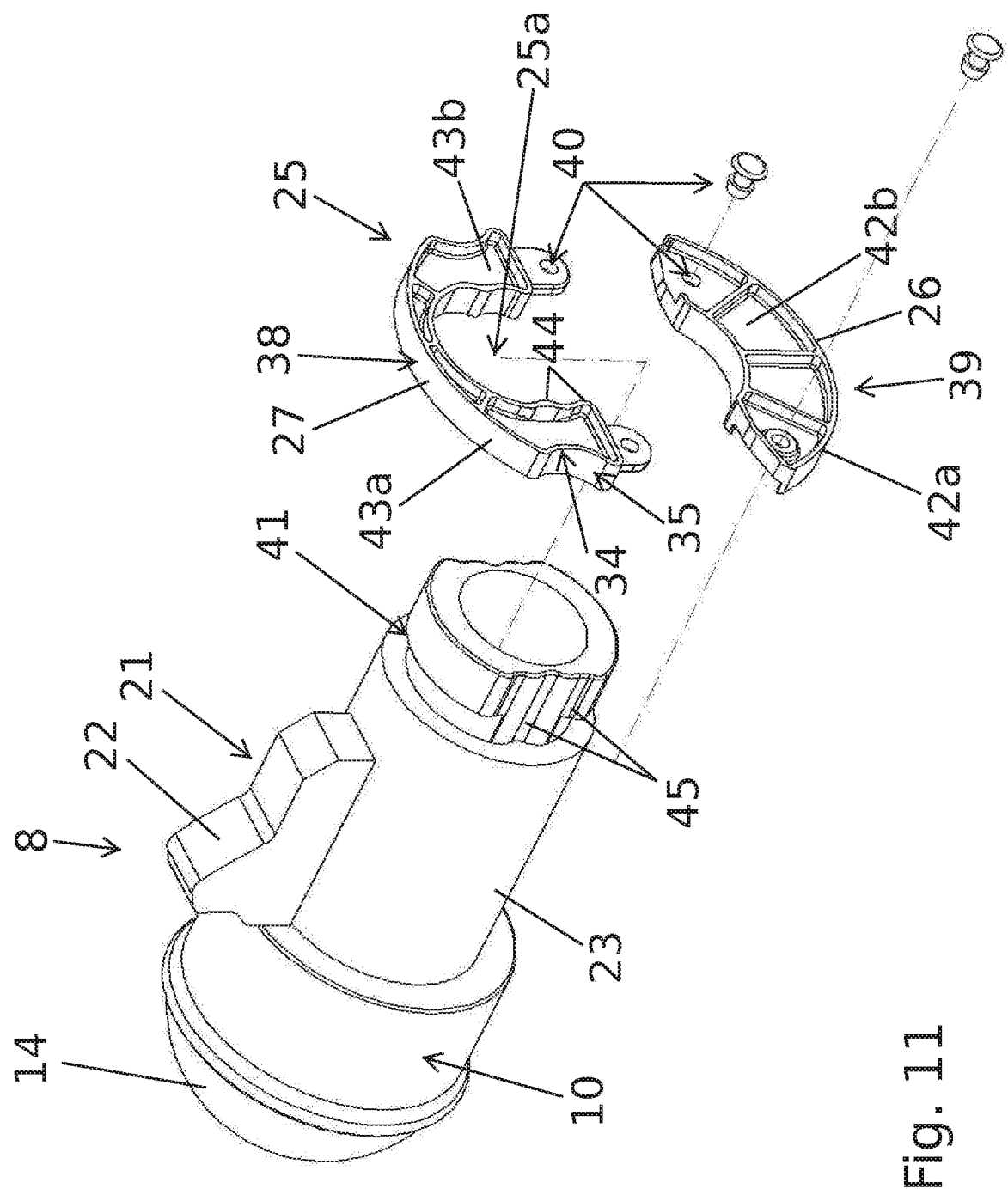
FIG. 11 shows an exploded representation of the further embodiment according to the invention according to FIGS. 9, 10.
Figure 12:
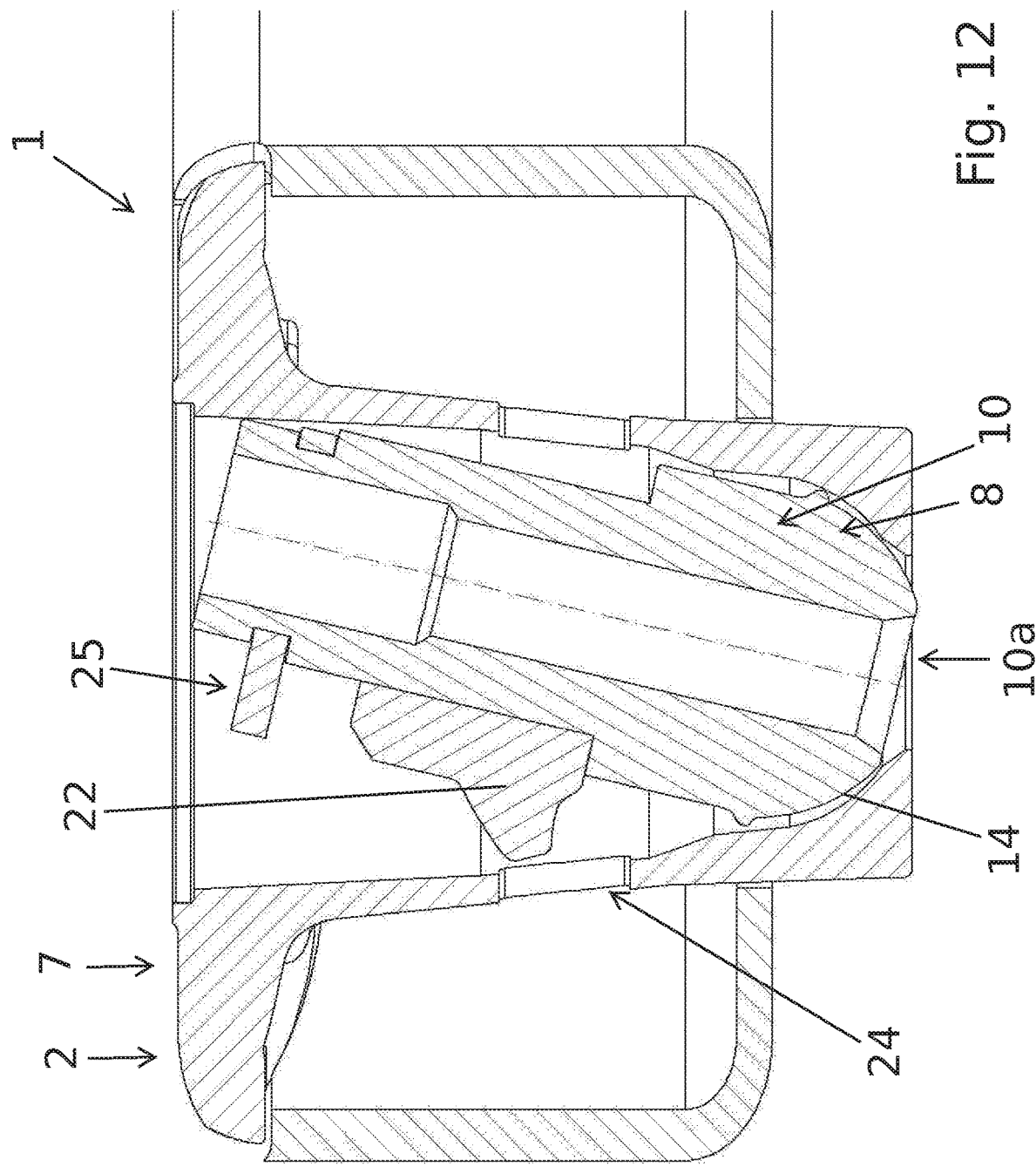
FIG. 12 shows a detail view of the formwork anchor receptacle according to FIG. 9 to 11 in the installation position on the formwork device.

As can be seen from FIG. 6 to 8, spacer element 25 is connected in one piece or integrally with a grip part 34 for the transfer of spacer element 25 between the first functional position and the second functional position. In the embodiment shown, grip part 34 is formed by two mutually opposite indentations 35 at the outer circumference of spacer element 25.

As can be seen from FIG. 2 to 8, a securing element 36 for securing spacer element 25 against moving away from receptacle 10 is also provided. In the embodiment shown, securing element 36 is formed by a securing ring 37, which is arranged on the end of receptacle element 10 facing away from ball section 14.

An alternative embodiment of formwork anchor receptacle 8 is shown in FIG. 9 to 12, wherein only the differences with a respect to the embodiment of FIG. 1 to 8 will be dealt with below.

In the embodiment according to FIG. 9 to 12, spacer element 25 comprises two half-shells 38, 39, which are connected detachably to one another by bolt connections 40. In the connected state, half-shells 38, 39 are arranged in a circumferential groove 41 of receptacle element 10. Half-shell 39 comprises here first contact surface 26, half-shell 38 second contact surface 27. For the formation of first contact surface 26, half-shell 39 comprises a circumferential flange part 42a, which projects from a plate part 42b. Half-shell 38 correspondingly comprises a circumferential flange part 43a, which projects from a further plate part 43b.

Figure 13:
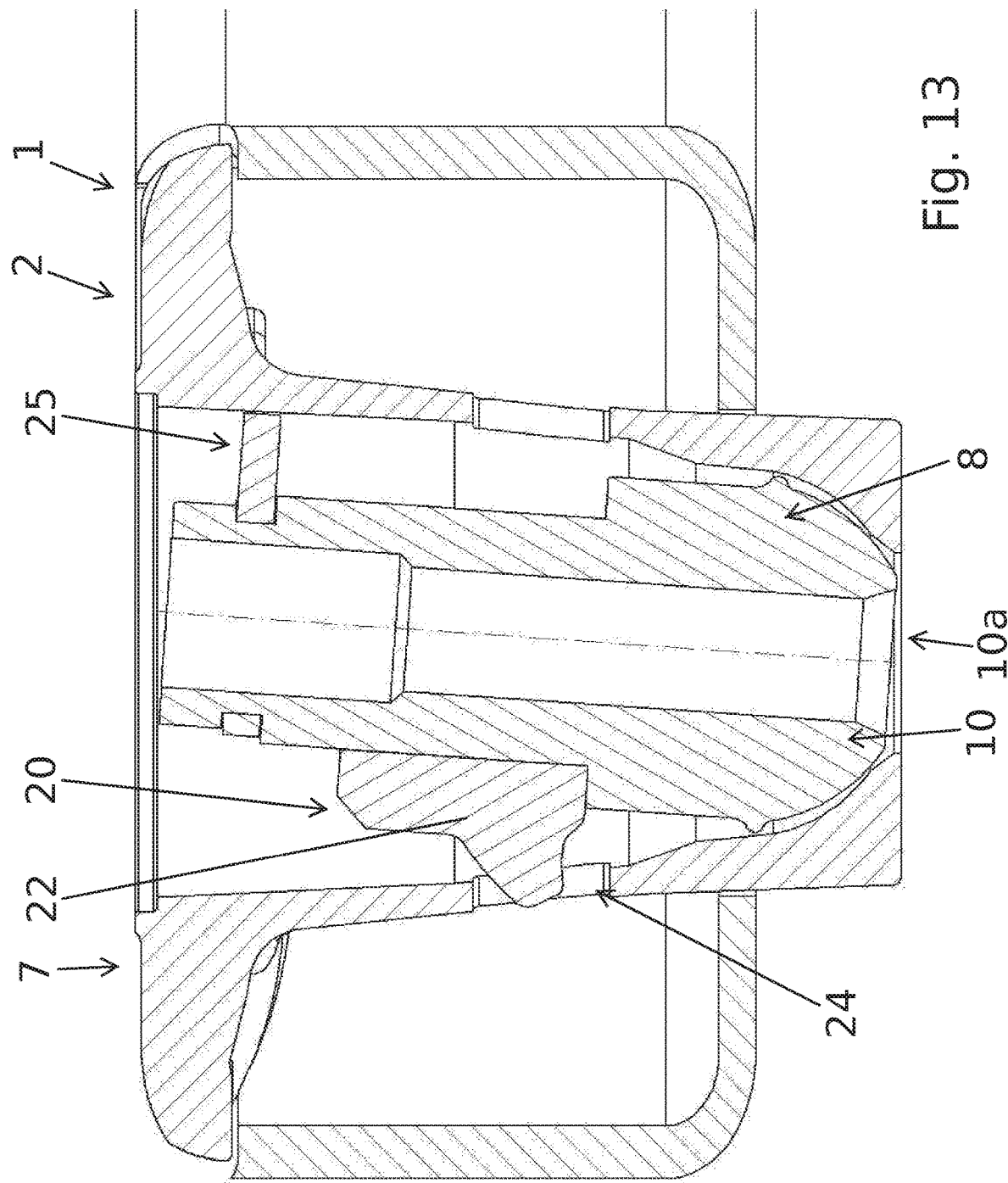
FIG. 13 shows a detail view according to FIG. 12, but in the operating position.

In this embodiment, anti-rotation securing member 30 comprises elastically deformable engagement elements 44, which are formed adjacent to mounting opening 25a on flange part 42 of half-shell 38. Engagement elements 44 engage in the anti-rotation secured state in corresponding indentations 45 of receptacle element 10. In this embodiment, spacer element 25 is arranged non-displaceably on receptacle element 10 in the longitudinal direction of the receptacle element 10. When spacer element 25 is rotated from the installation position (see FIG. 12), elevations 31 are elastically deformed, so that anti-rotation securing member 30 are released. When the operating position is reached (see FIG. 13), elevations 31 are again elastically deformed, until anti-rotation securing member 30 is present in the anti-rotation secured state.

The invention claimed is:

1. A formwork anchor receptacle for arrangement on a bearing element of a formwork element, having a receptacle element, which has a receptacle opening for insertion of an anchor rod and a ball section for mounting on the bearing element of the formwork element, and having a retaining apparatus for retaining the receptacle element on the bearing element of the formwork element, wherein the retaining apparatus comprises a spacer element for resting against the bearing element of the formwork element, wherein the spacer element comprises a mounting opening for mounting on the receptacle element;

wherein the spacer element at an outer circumference comprises a first contact surface curved in a shape of a circular arc for resting against the bearing element of the formwork element; and wherein the first contact surface of the spacer element has a first radial distance from a central axis of the receptacle element and a second contact surface of the spacer element has a second radial distance from the central axis of the receptacle element, wherein the first radial distance of the first contact surface is greater than the second radial distance of the second contact surface.

2. The formwork anchor receptacle according to claim 1, wherein an anti-rotation securing member is provided between the receptacle element and the spacer element, which anti-rotation securing member comprises at least one elevation and a corresponding recess.

3. The formwork anchor receptacle according to claim 1, wherein the spacer element can be transferred between a first functional position, for the mounting of the receptacle element on the bearing element, and a second functional position, for limiting tilting of the receptacle element in a first tilting direction, wherein the spacer element in the second functional position is arranged rotated through an angle differing from 0° or 360° relative to the receptacle element.

4. The formwork anchor receptacle according to claim 3, wherein the spacer element can be displaced from the first functional position in a longitudinal direction of the receptacle element into a first intermediate position, in which an anti-rotation securing member between the receptacle element and the spacer element is in a released state, wherein the spacer element can be rotated out of the first intermediate position into a second intermediate position, from which the spacer element can be displaced in the longitudinal direction of the receptacle element into the second functional position, in which the anti-rotation securing member is in a secured state.

5. The formwork anchor receptacle according to claim 4, wherein a spring element is provided for pretensioning the spacer element in a direction of the first or second functional position respectively, wherein the spring element comprises a helical spring between the spacer element and a bearing surface of the receptacle element in a shape of an annulus.

6. The formwork anchor receptacle according to claim 1, wherein the spacer element comprises half-shells connected to one another detachably, wherein the spacer element in the connected state of the half-shells is arranged in a circumferential groove of the receptacle element.

7. The formwork anchor receptacle according to claim 6, wherein the spacer element is mounted on the receptacle element non-displaceably in a longitudinal direction of the receptacle element, wherein an anti-rotation securing member comprises an elastically deformable engagement element.

8. The formwork anchor receptacle according to claim 1, wherein the retaining apparatus comprises an anti-rotation securing element for the anti-rotation securing of the receptacle element with respect to the bearing element of the formwork element, wherein the anti-rotation securing element comprises a projection on the receptacle element for engagement in a recess of the bearing element of the formwork element.

9. The formwork anchor receptacle according to claim 1, wherein a spacer disc with outer sides arranged parallel to one another is provided as the spacer element.

10. The formwork anchor receptacle according to claim 1, wherein the spacer element is connected to a grip part for transferring the spacer element between a first functional position and a second functional position, wherein the grip part is formed by at least one indentation of the spacer element.

11. The formwork anchor receptacle according to claim 1, wherein the spacer element is secured against removal from the receptacle element by means of a retaining element comprising a retaining ring, a retaining spring, or a screw connection.

12. A formwork anchor receptacle for arrangement on a bearing element of a formwork element, having a receptacle element, which has a receptacle opening for insertion of an anchor rod and a ball section for mounting on the bearing element of the formwork element, and having a retaining apparatus for retaining the receptacle element on the bearing element of the formwork element, wherein the retaining apparatus comprises a spacer element for resting against the bearing element of the formwork element, wherein the spacer element comprises a mounting opening for mounting on the receptacle element, wherein the spacer element at an outer circumference comprises a first curved contact surface for resting against the bearing element of the formwork element, wherein the first curved contact surface of the spacer element has a first radial distance from a central axis of the receptacle element and a second contact surface of the spacer element has a second radial distance from the central axis of the receptacle element, wherein the first radial distance of the first curved contact surface is greater than the second radial distance of the second contact surface.

* * * * *